Aug. 15, 1961  R. D. MAY  2,996,188
KNOCKOUT FOR SEPARATION OF WATER FROM EMULSIFIED OIL AND GAS
Filed Sept. 7, 1956  2 Sheets-Sheet 2
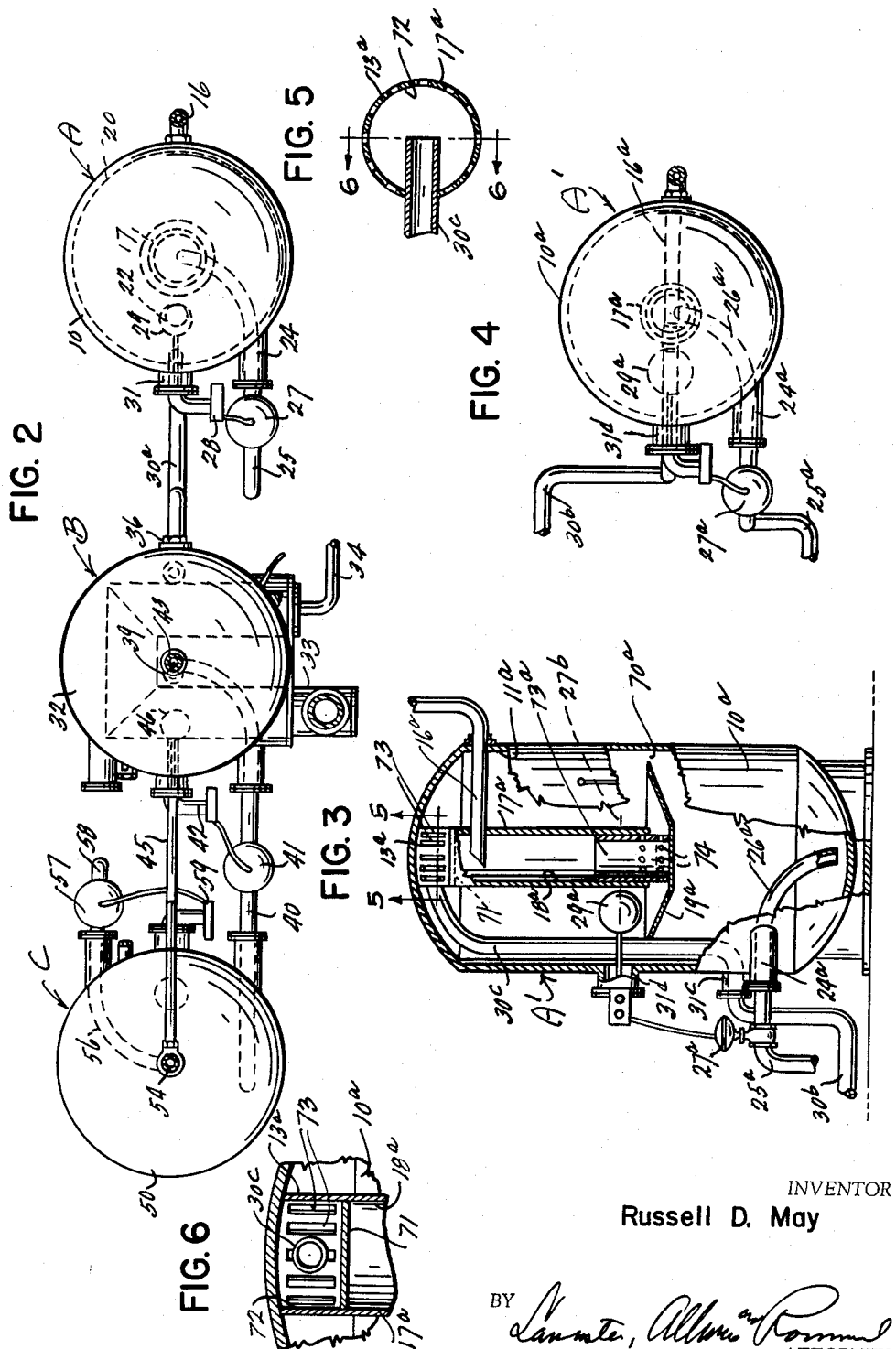
INVENTOR
Russell D. May

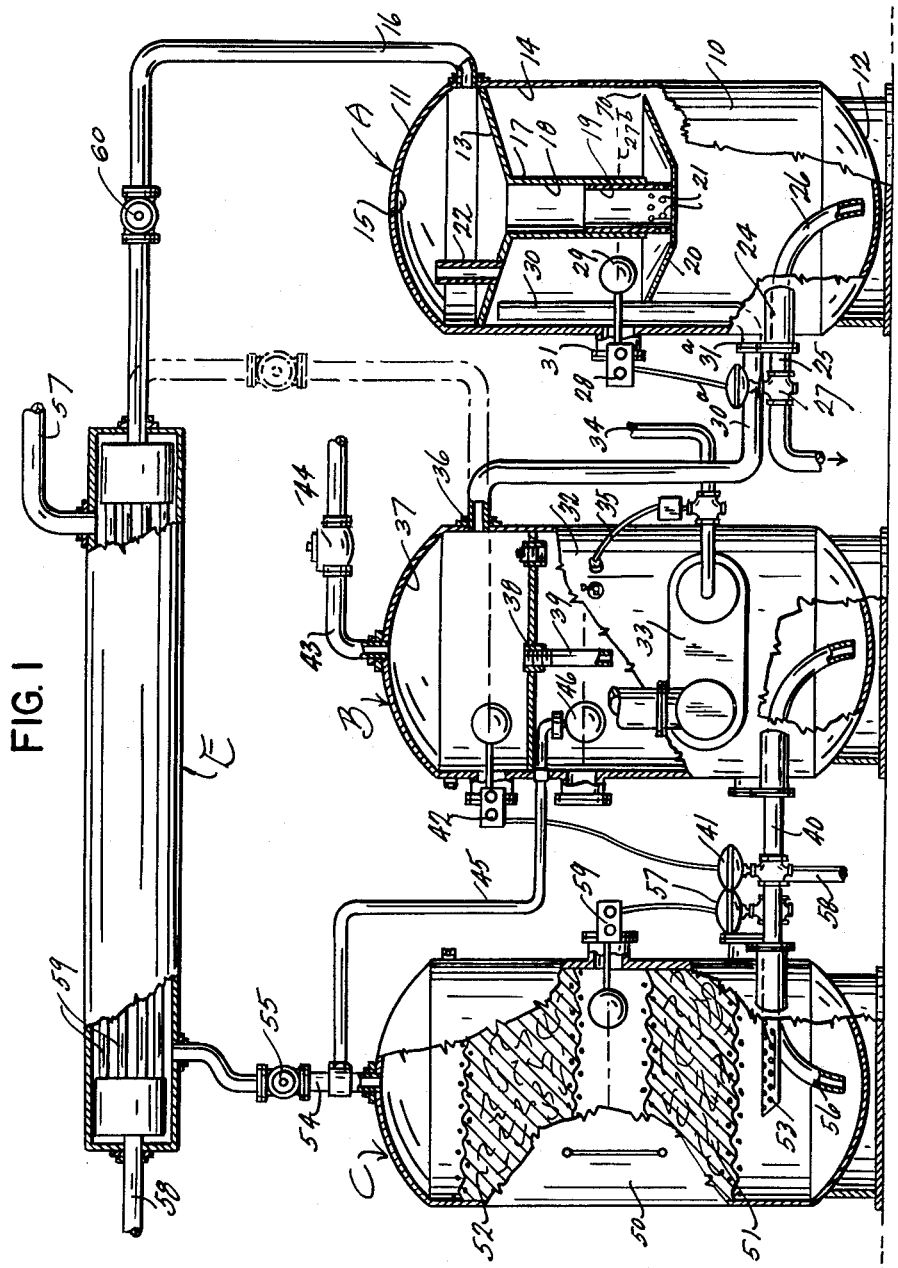
FIG. I
INVENTOR
Russell D. May

United States Patent Office 2,996,188
Patented Aug. 15, 1961

2,996,188
KNOCKOUT FOR SEPARATION OF WATER FROM EMULSIFIED OIL AND GAS
Russell Denton May, Tulsa, Okla., assignor to $H_2$ Oil Engineering Corporation, Tulsa, Okla., a corporation of Oklahoma
Filed Sept. 7, 1956, Ser. No. 608,624
4 Claims. (Cl. 210—114)

This invention relates to improvements in means for the separation of oil, gas and water from petroleum emulsions.

This application is a continuation-in-part of my U.S. Patent 2,864,502, patented December 16, 1958.

The primary object of this invention is the provision of an improved free water knockout for the initial separation of oil, water and gas from petroleum emulsions such as will leave the residue emulsion in proper condition of efficient treatment in later heating and filter separating stages.

A further object of this invention is the provision of an improved water knockout for use in multiple stage systems for the separation of petroleum emulsions, under hydrostatic pressure.

A further object of this invention is the provision of a free water knockout for use in a system for the efficient separation of oil, gas and water emulsions and particularly well adapted for the handling of emulsions which contain large volumes of gas.

A further object of this invention is the provision of an improved water knockout for a hydrocarbon and petroleum emulsifying system for improved aeration of dead oil in the system.

A further object of this invention is the provision of improved water knockout equipment for petroleum demulsifying systems, the parts of which can be selectively controlled to provide for most efficient treatment of the petroleum emulsion according to variations in oil, gas and water contents.

A further object of this invention is the provision of an improved water knockout for petroleum emulsifying systems which provide for optimum distribution and flow of the oil, gaseous vapors and water therethrough and therein.

A further object of this invention is the provision of a knockout for separating one liquid constituent part, such as water, from the emulsion, and in which an improved method and means is provided for insuring stabilization of the liquids in the water knockout in order that stratification may best be carried out.

A further object of this invention is the provision of an improved water knockout which is particularly well adapted for separating water from petroleum emulsion having small quantities of gases other than solution gas.

A further object of this invention is the provision of improved water knockout equipment adapted to be used in a multi-stage treating system wherein controlled pressures are maintained upon the contents.

Other objects and advantages of this invention will be apparent during the course of the following detailed description.

In the accompanying drawings forming a part of this invention, and wherein similar reference characters designate corresponding parts throughout the several views:

FIGURE 1 is a view, partly in section, and partly in diagrammatic, showing one form of my improved free water knockout together with heating and separating stages wherein the water knockout is capable of efficiently controlling petroleum emulsions having large volumes of gas.

FIGURE 2 is a fragmentary plan view of my improved free water knockout and the system illustrated in FIGURE 1.

FIGURE 3 is a fragmentary side elevation, partly in section, and partly diagrammatic, of another form of free water knockout for use under conditions where few gases other than solution gases are present in the emulsion.

FIGURE 4 is a plan view of the form of free water knockout shown in FIGURE 3.

FIGURE 5 is a cross sectional view taken substantially on the line 5—5 of FIGURE 3.

FIGURE 6 is a fragmentary cross sectional view taken substantially on the line 6—6 of FIGURE 5.

In the drawings, wherein for the purpose of illustration are shown different forms of my improved free water knockout for use in multiple stage treatment of petroleum emulsions, and wherein the structural features of the tank of the free water knockout are so standardized as to enable manipulated arrangement of the details thereof with other stages of treatment for producing optimum results, the letter A may generally designate one form of my improved free water knockout, B and C respectively a heater and a filtering stabilizer. Part of this multiple stage treatment may include a heat exchanger E, which receives the hot demulsified oil from the filtering and stabilizing stage treatment C for initially heating the emulsified petroleum to a predetermined temperature which will best serve the purpose of controlling and manipulating the same through the various stage treatments A, B and C, for the most beneficial recovery of the constituent parts.

The free water knockout A is primarily used as the initial step in multiple stage treatment of petroleum emulsions, to quickly and efficiently separate water from those petroleum emulsions containing an unusually high water content and a large volume of gases. It includes a vertically disposed cylindrical tank 10 having bulging top and bottom walls 11 and 12 respectively. It is provided with an inverted cone shaped partition wall 13 quite close to the top wall 11 and facing the same. The main chamber 14 of the tank 10 lies below the partition wall 13. The top shallower chamber 15, of less volumetric capacity, is adapted to initially receive the emulsified petroleum from an incoming pipe line 16. Centrally, the partition 13 is provided with a downwardly extending pipe 17, the passageway 18 of which at its lower end is provided with a height adjustable distributing head 19. The latter includes a pipe portion which telescopes into the passageway 18 and at its lower end is closed by a wall or baffle pan 20 which extends laterally so that the emulsified petroleum will of necessity pass through openings 21 in the pipe, and fall into the pan. Adjustment of the distributing head valve regulates the flow of emulsion through openings 21. This enables any released gas to lighten the oil, and enhances water separation. An upstanding pipe 22 is mounted upon the partition wall 13 extending upwardly into the compartment 15. The gas released from the emulsion above partition 13 passes through pipe 22 into the tank below said partition and passes off through pipe 30 together with the aerated oil. Pipe 22 permits pressures to properly balance between the compartments at opposite sides of partition 13.

The tank 10 at its lower portion is provided with a coupling connection 24 for a water discharge pipe line 25; the inner end of line 25 curving downwardly at 26 towards the bottom of the compartment 14, centrally thereof. Externally of the tank the pipe 25 is provided with an automatic dump valve 27 operated by a torque tube liquid level control 28. The latter is float operated. Its float 29 extends into the tank compartment 14 at a location where it can be controlled by variation in the density of the constituent parts of the emulsion; the water falling into the bottom of the compartment 14 below the float 29 and the emulsified oil lying in the upper part of the compartment above the float. Thus, free water is knocked out of the emulsion, as it settles in the tank preliminary to treatment of the emulsified oil. A pipe line 30 is vertically disposed inside of the compartment 14, along the wall of the tank; its lower end having a connection on tank 10 and passing at 30a therefrom for connection with the heater stage B. The pipe 30 opens at its top just under the partition wall 13. The emulsified oil and gas at the top of the compartment 14 will pass downwardly into the pipe 30 and thence into the heater stage B. It is to be particularly noted that the tank body of the free water knockout is provided with definitely located coupling connections for the mounting of the various pipes and controls. One of these connections being shown at 31 upon the tank 10 for the control 28, another at 31a for the pipe 30a, and another at 24 for water dump line 25.

In the free water knockout stage A the liquid is maintained under constant hydrostatic pressures, varying from 25 to 65 pounds above atmospheric, or even higher. Therefore a pump is not required to return the water knocked out at the dump valve to the make up tank. In this stage of treatment there are no fluid disturbances such as will affect the separation level of the oil and water for proper operation of the float 29, at the interface level 27b.

It will be noted that this level 27b is above the outlet openings 21 and also above the pan 20.

The water knockout A can receive emulsified oil directly from the well. Tank 10 is full of liquid at all times, since no gas column is provided as for water knockout A' to be subsequently described. The water level can be varied. Thus, the float 29 may be placed below the baffle pan 20, due to variation in the proportion of oil to water in the emulsion. This can be effected if desired by removing the deflector 20 and bending the float rod.

It will be noted that the deflector pan 20 is of considerable diameter. Its marginal edges are closely spaced at 70 annularly with respect to the inner wall of the tank 10 in order to regulate the speed of liquid flow. The width of this space 70 is preferably appreciably less than ¼ of the radius of the deflector baffle but such dimension may vary. It insures that the liquid will drop by gravity at the inner wall surfacing of the tank, and insures that a dead oil area will be avoided such as would occur if a small diametered pan is used.

For proper understanding of the water knockout stage it is necessary to have an understanding of the heat treating stage B, more fully described in my U.S. Patent 2,864,-502, dated December 16, 1958. Stage B includes a tank 32 of the same size and capacity as the tank 10, supporting a detachable heater 33.

The pipe line 30a from the free water knockout tank 10 is connected to the tank 32 at 36 for carrying the emulsified oil and gas into the upper portion 37 of the tank 32. This emulsion will then pass into the lower portion of the tank 32 past the partition 38 through the pipe 39; coming into contact with the heater 33 for heating to a temperature sufficient to break the emulsion. The broken emulsion passes through the pipe line 40; flow thereof being regulated by valve 41 which is controlled by a torque tube liquid level control 42 for correlating the inflow and outflow of the liquids to and from the tank 32.

The formation gases accruing in the top of the tank 32 are carried off through a pipe line 43; a pressure regulating valve 44 being utilized to maintain the desired pressure in the tank 32.

A pipe line 45 equipped with a float valve 46 is provided to carry off the rich high gravity gases trapped beneath the partition 38.

It will be noted that up to this point there is an absolute control of pressure in the free water knockout A and the heater B; the continuous flow treatment taking place in a closed system with the tanks 10 and 32 operating full of fluid at all times, with the exception of gas displacement areas. This back pressure control within the system results in increased gravity of the oil.

It is to be understood that pressures may be so regulated as to insure maintenance of the proper superatmospheric pressures in the tanks.

Referring now to the filtering and stabilizing stage C, more fully described in my U.S. Patent 2,864,502, dated December 16, 1958, the same includes a tank 50 of the same volumetric capacity as the tanks 10 and 32. The tank 50 is provided with two spaced filters 51 and 52.

The broken emulsion enters tank 50 through the pipe line 40 leading from the heater B; being fed thereinto through the perforated nozzle 53. It then passes through the primary and secondary filters 51 and 52 respectively and out through the pipe line 54. In this pipe line 54 is disposed a back pressure expansion valve 55 for holding pressures in the tank 50 at the desired amounts. The gases are further condensed in passing through this valve to further enrich the oil.

An outlet pipe 56 is provided at the lowermost portion of the tank 50 for discharging water through valve 57 and thence through pipe line 58. The discharge of this water through valve 57 is regulated by a float controlled torque tube liquid level device 59.

Rich gases from the heater B flowing through the pipe 45 will enter the pipe line 54 as shown in FIGURE 1 and mingle with the demulsified oil prior to release through expansion or back pressure valve 55.

The demulsified oil passes into a heat exchanger E via the pipe line 54 and thence out through the outlet 57. The petroleum emulsion entering the system at 58 passes through the heat exchanger E in pipes 59; being heated therein by the demulsified product, and thence passes through pressure regulating valve 60 into pipe 16.

Referring to FIGURES 3 to 6 inclusive, the same shows a modified type of water knockout A' adapted for use with a down flow treatment of emulsified oil and water. It has been partially described in my U.S. Patent 2,864,502, dated December 16, 1958. It includes a tank 10a similar in shape and capacity to the tank 10 of the water knockout of FIGURE 1. It has a chamber 11a wherein a tube or sleeve 17a is supported from the dome of the receptacle 10a. This tube 17a, short of the dome, as shown in FIGURE 6, is provided with a baffle partition 71 dividing its passageway into a lower elongated compartment 18a and an upper chamber 72. The upper portion of the sleeve or tube 17a comprising an oil baffle is provided with vertical slots 73 for purposes to be subsequently described. The pan shaped distributing head 19a is substantially identical with the distributing dome or head 20 of the water knockout A. It has an upper sleeve portion 73a movably fitting into the passageway of the tank 17a for vertical adjustment therein.

The sleeve 73a in its lower portion is provided with a series of distributing openings 74 which regulate passage of the emulsion and gas onto the deflector plate 19a. The space 70a between the outer periphery of the distributing head 19a and the inner wall of the tank 10a possesses the same characteristic as for the space 70 of knockout A. An inlet pipe 16a is provided in the upper part of the tank entering the chamber 18a of the tube 17a for discharging emulsified petroleum into the chamber 18a.

An oil discharge line 30b is connected in the tank 10a at a connection 31c, extending upwardly at 30c in the tank along the side wall thereof and having an upper curved end which opens into the chamber 72 of the slotted upper distributing end of the sleeve 17a above the partition 71, as shown in FIGURES 5 and 6 of the drawing.

A water discharge line 25ᵃ is attached at the connection 24ᵃ in the tank, having a curved end 26ᵃ within the tank for receiving free water from the central bottom of the tank. The 25ᵃ is provided with a dump valve 27ᵃ therein operated by float means 29ᵃ which is connected to a conventional torque liquid level device attached in the connection 31ᵈ. The float 29ᵃ operates at the oil-water interface indicated by dotted line 27ᵇ in FIGURE 3. This is preferably above the pan 19ᵃ and outlet openings 74.

The type of knockout shown in FIGURES 3 and 4 is used where gas is taken from the emulsified oil initially with the exception of some minor amounts of gas. These together with water and emulsion enter the line 16ᵃ for feed into the tube 17ᵃ. An oil level is maintained in the tube 18ᵃ, generally just above the openings 74. This enables released gases to be trapped in the tube chamber 18ᵃ below the baffle wall 71. This body of trapped gases acts as a damper to eliminate surging of the demulsified product entering from the line 16ᵃ. Thus, the liquid is stabilized in the entire knockout tank in order that oil and water separation can take place under optimum conditions.

There may exist a proper ratio between the internal diameter of the passageway in the tubes 17 and 17ᵃ of the forms of invention A and A′, with respect to the internal diameter of the tank in which positioned, in order to control velocity of the output according to characteristics of the oil used and production desired.

The space in the chamber 11ᵃ above the interface 27ᵇ is entirely filled with emulsified oil.

The inlet end of the pipe 30ᶜ extended into the chamber 72 at the slotted top of the tube 17ᵃ, as shown in FIGURE 5. This insures proper distribution of and facilitates oil discharge flow.

When the valve 27ᵃ is open a lower pressure exists below the pan 19ᵃ to assure optimum water takeoff. Of course the extent of such pressure depends upon the water level as operated by the float means 29ᵃ. This lighter oil gathers immediately above the deflector pan 19ᵃ, and because of the gas bubbling action the oil will be aerated in the upper space of the chamber 11ᵃ.

It will be noted that the position of the baffle 20 and 19ᵃ and the position and extent of effective discharge area of the openings 21 and 74 may be adjusted to control aeration according to the type of emulsion being treated.

It will thus be seen that I have provided a free water knockout of a compact and efficient nature wherein the same tank may be used with various internal modifications for the treatment of emulsions of varying constituent parts.

I do not wish to be limited to the treatment of petroleum emulsions as this free water knockout may be used for the treatment of various other emulsions. I have used petroleum emulsions as an example throughout this description for the purpose of clarity.

Various changes in the shape, size and arrangement of parts may be made to the structures herein illustrated and described, without departing from the spirit of the invention or the scope of the following claims.

I claim:
1. In a free water knockout for resolving hydrocarbon emulsions the combination of a vertically elongated tank having a chamber therein, a tube supported by the upper portion of said tank in said chamber and depending downwardly into said chamber, means for admitting gaseous hydrocarbon emulsions into the upper portion of said tube, a distributing head mounted upon the lower end of said tube for laterally distributing gaseous hydrocarbon emulsions into said chamber for aeration of the body of liquid in said chamber, said tube at the upper end thereof being sealed above the emulsion inlet to provide a gas space above the liquid level in the tube, whereby trapped gases in said space act as a damper to eliminate surging of the emulsified petroleum in said tube, means for discharging water from the lower part of said chamber below the distributing head including a valve, control for regulating said valve having means operated by the level of water and oil in said chamber, means providing a vented compartment in the extreme top of said chamber above said tube and into which gaseous oil emulsion flows from said chamber, and means for the withdrawal of the gaseous oil emulsion from said vented compartment to a locus externally of said tank.

2. A free water knockout as defined in claim 1 in which valve means is provided upon said tube at the lower end thereof for regulating the quantity discharge of gaseous emulsion onto said distributing head.

3. A free water knockout for use in apparatus for the separation of oil and gas from free water comprising a tank having a chamber therein, a tube mounted in the tank and depending in said chamber and positioned in upright relation and having a passageway therein, inlet means connected with the tank for admitting emulsified oil, gas and water into the tube, a lateral deflector mounted at the lower end of said tube for receiving emulsified oil, water and gas from said tube for lateral distribution into the chamber of said tank whereby free water may descend by gravity into the tank chamber below the deflector, valve means on the lower end of said tube for regulating the amount of emulsified oil, water and gas which will pass from the tube onto said deflector, means for discharging free water from the lower portion of the tank chamber, and means for discharging emulsified oil and gas from said tank chamber.

4. Apparatus as described in claim 3 in which the tank is devoid of means for separately discharging the gas and emulsified oil from the tank whereby the last mentioned discharge means will pass from the tank the emulsified oil with gas entrained therein.

References Cited in the file of this patent

UNITED STATES PATENTS

| | | |
|---|---|---|
| 1,490,794 | Alexander | Apr. 15, 1924 |
| 2,181,684 | Walker | Nov. 28, 1939 |
| 2,398,338 | Walker | Apr. 9, 1946 |
| 2,400,713 | Rhees | May 21, 1946 |
| 2,624,463 | Freese | Jan. 6, 1953 |
| 2,659,488 | Williams | Nov. 17, 1953 |

UNITED STATES PATENT OFFICE

CERTIFICATE OF CORRECTION

Patent No. 2,996,188                                           August 15, 1961

Russell Denton May

It is hereby certified that error appears in the above numbered patent requiring correction and that the said Letters Patent should read as corrected below.

Column 1, line 32, for "emulsifying" read -- demulsifying --; line 54, for "emulsion" read -- emulsions --; column 5, line 6, for "The 25ª" read -- The line 25ª --; line 41, for "This" read -- The --; line 45, for "baffle" read -- baffles --.

Signed and sealed this 26th day of December 1961.

(SEAL)
Attest:

ERNEST W. SWIDER
Attesting Officer

DAVID L. LADD
Commissioner of Patents

USCOMM-DC